United States Patent [19]

Reintjes et al.

[11] Patent Number: 5,012,483
[45] Date of Patent: Apr. 30, 1991

[54] NARROW-BANDWIDTH DIFFRACTION-LIMITED COUPLED STABLE-UNSTABLE RESONATOR LASER CAVITY

[75] Inventors: John F. Reintjes, Alexandria, Va.; Lawrence L. Tankersley, Annapolis; David G. Cooper, Riva, both of Md.; James L. Dexter, Alexandria, VA

[73] Assignee: The United States of America as represented by the Secretary of the Navy, Washington, D.C.

[21] Appl. No.: 589,142

[22] Filed: Sep. 27, 1990

[51] Int. Cl.⁵ ................................................ H01S 3/08
[52] U.S. Cl. ........................................ 372/95; 372/97; 372/101; 372/103
[58] Field of Search ............... 372/95, 97, 98, 92, 372/101, 103

[56] References Cited
U.S. PATENT DOCUMENTS
4,868,515 9/1989 Reintjes et al. ................... 372/95

Primary Examiner—James W. Davie
Attorney, Agent, or Firm—Thomas E. McDonnell; George Jameson

[57] ABSTRACT

A laser cavity providing high power laser radiation with diffraction-limited divergence and narrow-bandwidth comprises: a stable laser cavity including a gain medium, which generates and amplifies laser radiation, optically coupled to first and second reflectors and an optical coupler; and an unstable laser cavity including the gain medium, the first reflector, the optical coupler and a scraper mirror. The scraper mirror is located between the gain medium and the optical coupler for producing an output beam. The stable laser cavity is restricted to operate on a low order TEM mode by an aperture located between the optical coupler and the second reflector. A frequency narrowing element located between the optical coupler and the second reflector narrows the bandwidth of the laser radiation in the stable laser cavity. The optical coupler couples the narrow bandwidth laser radiation from the stable laser cavity to the unstable laser cavity, thereby producing narrow bandwidth laser radiation in the output beam.

12 Claims, 2 Drawing Sheets

NARROW-BANDWIDTH DIFFRACTION-LIMITED COUPLED STABLE-UNSTABLE RESONATOR LASER CAVITY

FIELD OF THE INVENTION

The present invention relates generally to a laser cavity, and, more specifically, to a coupled stable-unstable resonator cavity providing high-power, diffraction-limited, narrow-bandwidth laser radiation.

BACKGROUND OF THE INVENTION

Many applications for lasers, including spectroscopic studies, materials processing, nonlinear optical interactions and information transmission, require laser radiation which is characterized by: a) high power; b) diffraction-limited divergence; and c) narrow bandwidth. Reduction of the divergence and bandwidth of conventional lasers is accomplished by restricting the spatial and spectral modes of the laser radiation, which usually results in decreasing the output power. Methods and apparatus which provide all three characteristics simultaneously are usually costly and complicated, and often require multiple laser sources.

Stable laser cavities, for example, are used to provide radiation having low spatial divergence and narrow bandwidth. Low spatial divergence is obtained by restricting the laser aperture to operate in the lowest transverse mode of the stable cavity. For near infrared or shorter wavelengths, aperture diameters on the order of 1 millimeter (mm) or less are required, while gain medium diameters of several centimeters are common. As a result, the power available from a stable laser cavity is limited, often to values that are orders of magnitudes less than those obtainable if the full aperture of the gain medium could be used. The bandwidth of stable cavities is usually restricted by using a conventional dispersing element, i.e., a grating, a prism or a Fabry-Perot etalon, in the cavity to spread the radiation angularly according to wavelength. Narrow-bandwidth operation is then obtained by restricting the angular acceptance of the cavity. This operation is compatible with a mode-restricting aperture used for limiting the spatial divergence, as described above, but is incompatible with high power operation.

High power laser sources are obtainable with narrow bandwidths and low divergence radiation using laser amplifiers downstream of the resonator. The output power which can be extracted from the stable resonator is severely restricted by the aperture diameter. As a result, one or more stages of amplification are required to increase the output power to a level equal to the gain available from the gain medium. Such systems are the primary source for laser radiation with all three desired characteristics, but the multiple lasers required by these systems increase both the size and cost of the system. In addition, the complexity of the optical train required to match the output of one stage into the input of the next stage increases. For pulsed laser systems, jitter in timing between the various stages can reduce system reliability.

Unstable resonators provide an alternative approach to obtaining high power, low divergence laser radiation. In unstable resonators, the laser radiation fills a relatively large diameter cavity, allowing operation at high power levels while restricting the divergence of the generated laser radiation to a low value, usually near the diffraction limit for a suitably designed system.

Some success has been achieved in frequency narrowing the laser radiation from unstable resonator cavities using gratings, which work best with lasers having sharp line structure, e.g., molecular lasers. For example, selection of a single line in HF and $CO_2$ lasers by insertion of a grating into a conventional unstable resonator cavity is known.

In lasers having broad-band continuous gain distributions, i.e., excimer and dye lasers, insertion of a grating in an unstable resonator cavity does not provide sufficient spectral discrimination for narrow-band operation. The unstable resonator cavity is fundamentally incompatible with the frequency narrowing elements used in restricting the bandwidth, especially when extremely narrow linewidths are desired. The modes of an unstable resonator cavity require that divergence of the laser radiation inside the cavity alternate between high and low values on alternate passes through the cavity. As a result, it is not possible to use angular discrimination to restrict the bandwidth of the laser radiation as is done in stable cavities. Thus, although unstable resonator cavities are the configuration of choice for providing high power, low divergence laser radiation, they are usually not compatible with a simultaneous requirement for narrow bandwidth.

An unstable resonator cavity employing a telescopic full cavity ring, in which the gain medium and the ring form a continuous loop and the magnification is achieved by a telescope within the ring, is also known. This cavity has extensive collimated regions that offer the potential for frequency narrowing. However, the beam passes through the gain medium only once on each cavity round trip. As a result, this type of cavity generally requires a large number of cavity transits to reach threshold and can work only with lasers that have gain media with a combination of high gain and long lifetime.

An unstable resonator cavity laser developed by some of the inventors of the present invention is disclosed in U.S. Pat. No. 4,868,515, which achieves all three desirable characteristics of high power, low divergence and narrow bandwidth by employing an asymmetric feedback ring. This invention represents a substantial improvement in the state of the art because the feedback ring provides a section of the cavity that contains only collimated laser radiation, thus allowing optimal use of frequency narrowing devices, e.g., Fabry-Perot etalons. At the same time, the length of the feedback ring can be kept to a minimal value, and the laser radiation makes two passes through the gain medium on each cavity transit, thus overcoming the limitations of the cavity with the full telescopic ring. As a result, this cavity works with all types of lasers, including the class of lasers in which the gain medium has limited gain or lifetime, such as electric discharge rare gas halide excimer lasers, with which the resonator with the full cavity ring would not work.

An alternative approach for producing high power laser radiation with low divergence and narrow bandwidth is to couple together a stable and an unstable resonator. In one existing system, laser radiation from the stable resonator passes through a hole in a mirror of the unstable resonator, which is located within the stable resonator. Laser radiation coupled into the unstable resonator is reflected from the mirror surrounding the hole. Thus, only the outer edge of the laser radiation within the stable resonator is coupled into the unstable resonator. The outer edge is the part of the laser radiation most sensitive to imperfections in the diffraction structure. In addition, both the fraction of laser radiation coupled out of the stable resonator and the purity of the mode within the stable resonator are determined by the size of the hole. As a result, it is not possible to simultaneously optimize the operation of both the stable and unstable resonators for mode structure and power.

Other techniques for coupling stable and unstable resonators are known. One approach, for example, uses two mirrors with different curvatures so that the resonator is stable in one direction but unstable in the opposite direction. Such techniques do not produce laser radiation with the low divergence required for efficient frequency narrowing. Another approach uses two separate cavities operating with a common mirror, producing all the disadvantages of multiple laser stages discussed above.

SUMMARY OF THE INVENTION

It is one object of the present invention to provide a laser cavity which couples a stable laser cavity and an unstable laser cavity so as to produce laser radiation characterized by high power, diffraction-limited divergence and narrow-bandwidth.

These and other objects and advantages are achieved in accordance with the present invention by a laser cavity comprising a stable laser cavity operating at a low order transverse electromagnetic (TEM) mode and providing narrow bandwidth laser radiation; an unstable laser cavity disposed within the stable laser cavity; and an optical coupler located within the stable laser cavity and coupled to the unstable laser cavity for coupling the narrow bandwidth laser radiation from the stable laser cavity to the unstable laser cavity. A frequency narrowing element or means located within the stable laser cavity produces laser radiation with a narrow bandwidth.

According to one aspect of the present invention, the optical coupler is a lens of substantially zero power having a reflective coating on a first surface and a non-reflective coating on a second surface. The optical coupler transmits laser radiation in the stable laser cavity without affecting the mode of the laser radiation. The reflective coating on the first surface of the optical coupler couples laser radiation out of the stable laser cavity into the unstable laser cavity.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DESCRIPTION OF THE PREFERRED EMBODIMENTS

The present invention allows for the advantage that the radiation coupled from the stable to the unstable resonator originates from the whole mode of the stable resonator, and not just the outer edges as in previous teachings. This provides radiation with higher spatial quality in the unstable resonator, because the outer edges of the stable mode are the most sensitive to imperfections in the optics. It also allows the output coupling fraction of the stable cavity to be adjusted independently, thus allowing optimization of the operation of the stable cavity.

Figure 1:
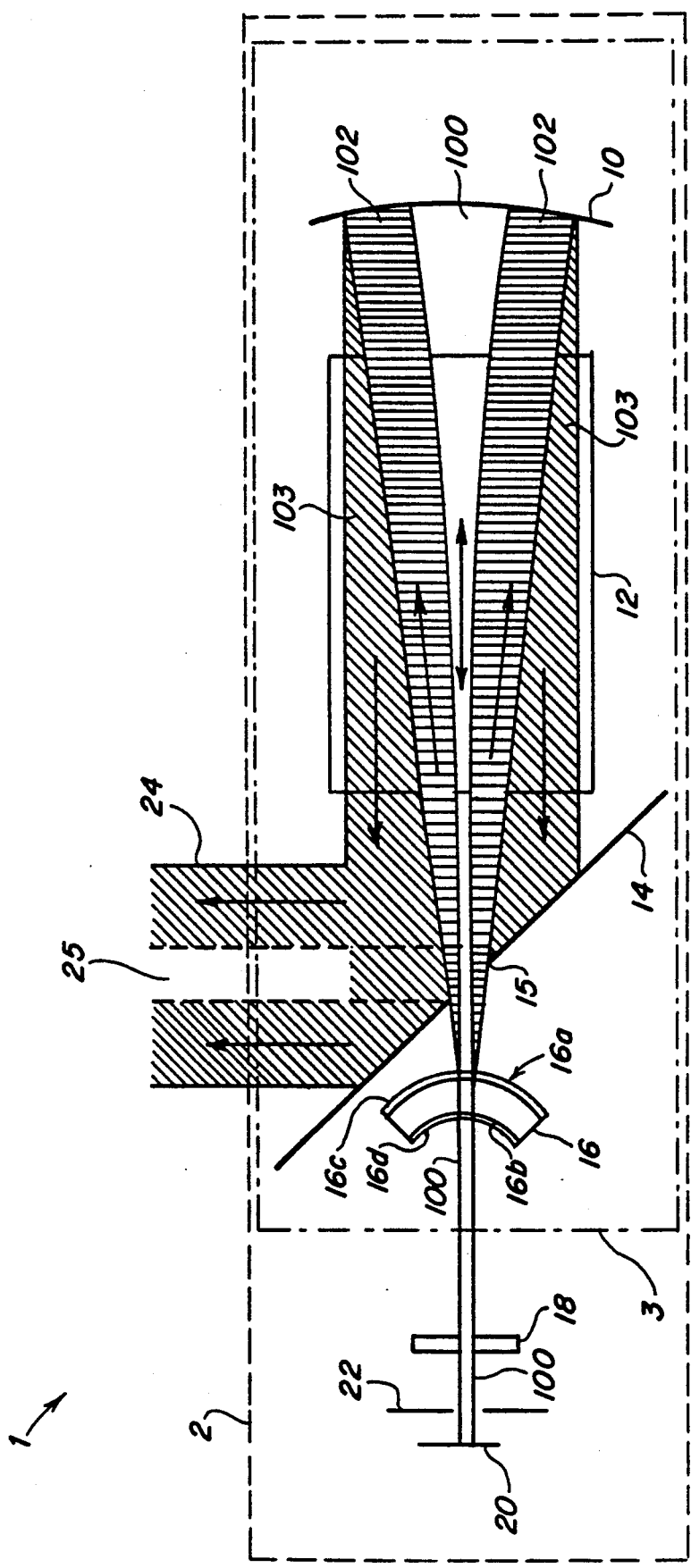
FIG. 1 illustrates a schematic diagram of a coupled laser cavity in accordance with an embodiment of the invention.

FIG. 1 shows a coupled laser cavity 1 according to the present invention comprised of a stable laser cavity 2 operating on a low order TEM mode, and an unstable laser cavity 3. Laser cavity 2 includes a concave reflector 10 used for reflecting and collimating laser radiation, a gain medium 12 for producing and amplifying laser radiation and a reflector 20 for reflecting laser radiation. Reflector 20 can be a flat or curved reflector and, in conjunction with reflector 10, satisfies the condition for stable cavity operation of laser cavity 2, which is that $0 \leq [(1-L/R_{10})(1-L/R_{20})]$, where $R_{10}$ is the curvature of reflector 10, $R_{20}$ is the curvature of reflector 20 and L is the separation of reflectors 10 and 20. It will be appreciated that when either reflector 10 or 20 is a flat surface, e.g., a surface with an infinite radius of curvature, the term $L/R$ goes to zero and the entire term $(1-L/R)$ is equal to one. Reflector 20 advantageously can also be a diffraction grating for contributing to the frequency narrowing in laser cavity 2. Located between gain medium 12 and reflector 20 are an optical coupler 16, the operation of which is explained in detail below; and a frequency narrowing element or means 18, located between optical coupler 16 and reflector 20, for narrowing the bandwidth of the laser radiation. Also located between optical coupler 16 and reflector 20 on either side of the frequency narrowing element 18 is a mode selecting aperture 22, which restricts the transverse distribution of the laser radiation to a low order TEM mode of laser cavity 2. Frequency narrowing element 18 can be, for example, one or more diffraction gratings, one or more prisms, one or more Fabry-Perot etalons, or a combination thereof.

Laser cavity 3 includes the reflector 10, the gain medium 12, the optical coupler 16 and a scraper mirror 14, having a hole 15 aligned with the centerlines of both laser 2 and laser 3, for coupling laser radiation out of coupled laser cavity 1. Thus, reflector 10, gain medium 12 and optical coupler 16 are common to both laser cavity 2 and laser cavity 3.

Optical coupler 16 is a lens of substantially zero power with convex and concave surfaces 16a and 16b, respectively, which are substantially parallel to each other. Convex surface 16a is provided with a reflective coating 16c for reflecting a predetermined percentage of the laser radiation, while concave surface 16b is provided with an anti-reflective coating 16d. It will be appreciated that coating 16c provides output coupling for radiation from stable cavity 2 into unstable cavity 3, but its reflectivity is such that stable cavity 2 can operate above its own threshold. It will also be appreciated that coating 16c couples a percentage of the entire laser radiation output of stable cavity 2 into unstable cavity 3, unlike systems which couple only the outer edge of the laser radiation within a stable resonator into an unstable resonator. For purposes of illustration, optical coupler 16 and reflector 10 are shown in FIG. 1 with curvatures and separation such that they form a confocal pair, and the output beam 24 is collimated. However, somewhat greater or smaller separations or curvatures can be used, resulting in an output beam that is either converging or diverging.

Operation of laser cavity 1 originates with the buildup of laser radiation in laser cavity 2, from which a portion is transferred to laser cavity 3, and from which portion output beam 24 is produced. In the operation of laser cavity 2, gain medium 12 generates a beam 100 of laser radiation, which is reflected by reflector 10 back into gain medium 12, where it is amplified and transmitted toward mirror 14. Beam 100 passes through hole 15 in scraper mirror 14 and strikes optical coupler 16. A percentage of laser beam 100 is transmitted through optical coupler 16 and strikes reflector 20 after being frequency narrowed in element 18 and mode restricted in aperture 22 Reflector 20 reflects beam 100 toward gain medium 12 via aperture 22, frequency narrowing element 18 and optical coupler 16. Laser radiation in beam 100 enters gain medium 12, where it is amplified and begins another round trip of laser cavity 2.

A predetermined percentage of beam 100 is reflected by convex surface 16a of optical coupler 16 and is coupled out of laser cavity 2 into laser cavity 3 as beam 102. Beam 102 is directed by optical coupler 16 toward reflector 10, expanding in size as it propagates, via gain medium 12, where it is amplified. It strikes reflector 10, at which point its width matches the width of the gain medium 12, and is reflected by reflector 10 toward gain medium 12 and is collimated as beam 103. Beam 103 is amplified in gain medium 12 before reaching scraper mirror 14. Laser radiation in beam 103 striking scraper mirror 14 is coupled out of laser cavity 3, and therefore out of coupled laser cavity 1, by scraper mirror 14, thereby forming output beam 24. Output beam 24 has the shape of an annular ring with a centerline hole 25 corresponding to hole 15. Thus, the output of coupled laser cavity 1 is provided by unstable laser cavity 3, which characteristically provides nearly diffraction-limited laser radiation.

It will be appreciated that there are means other than scraper mirrors, such as diffraction around bullet mirrors or dot reflectors, for coupling radiation out of unstable laser cavities.

Figure 2:
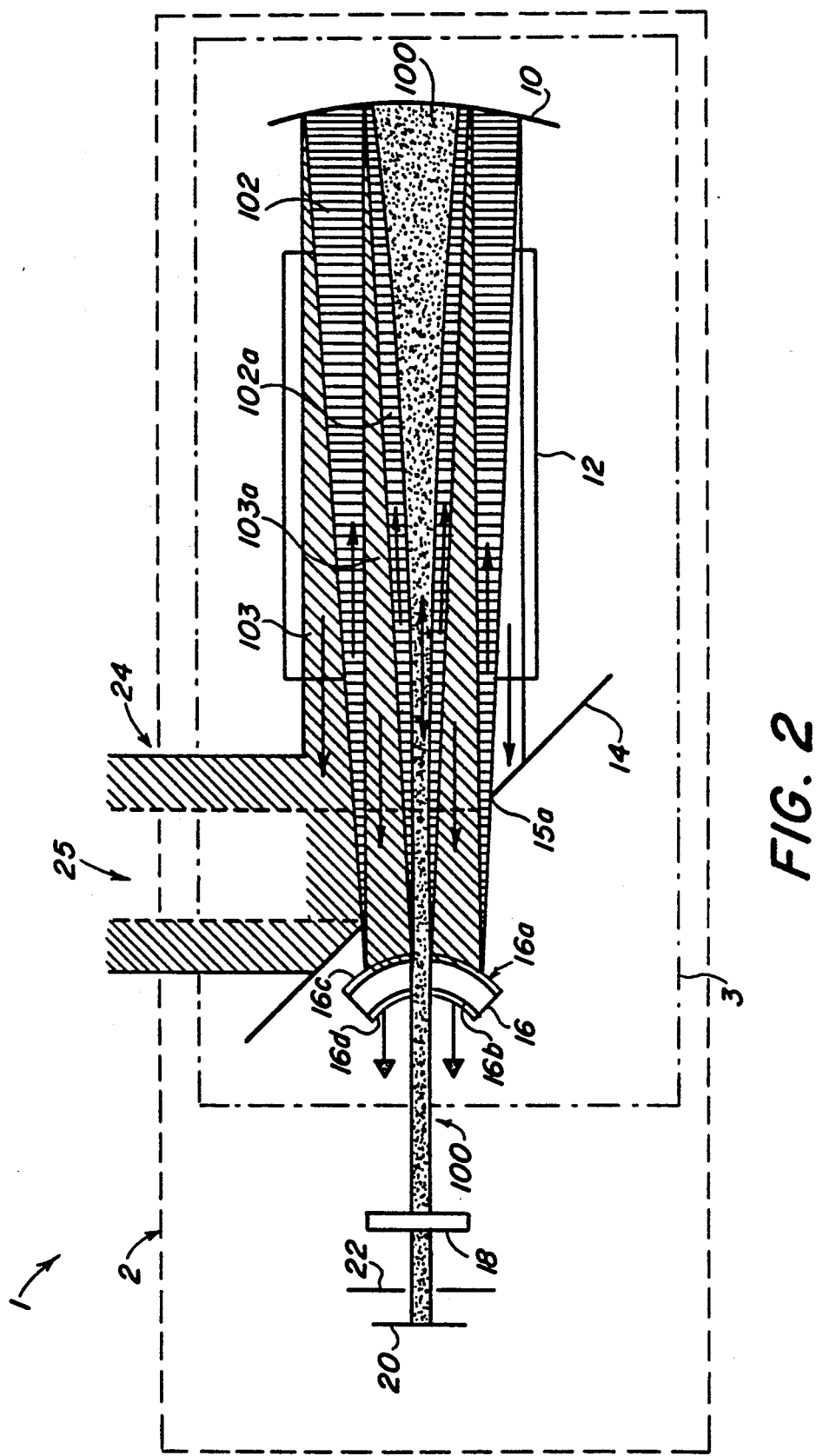
FIG. 2 is a modification of the embodiment of FIG. 1 in which the diameter of the Fresnel core of the unstable resonator is larger than the stable mode size of the stable resonator, allowing more passes of radiation from the stable resonator in the Fresnel core before being coupled out of the laser.

FIG. 2 shows a modification of the embodiment of FIG. 1 in which the size or diameter of the Fresnel core of unstable laser cavity 3 is greater than the size of the lowest order mode of stable laser cavity 2. In the FIG. 2 modification, laser radiation leaves optical coupler 16 as beam 102a, which does not expand to the full width of the gain medium 12 before striking reflector 10. It is collimated and reflected by reflector 10 as beam 103a, in a manner similar to that for beam 103 in FIG. 1, but remains in the Fresnel core of laser cavity 3. Beam 103a is amplified by gain medium 12 and strikes optical coupler 16, from which it is reflected as expanding beam 102, as also shown in FIG. 1. Beam 102 is then amplified, collimated and reflected by reflector 10 as beam 103. Beam 103 is amplified and reflected by scraper mirror 14 to form output beam 24. Thus, FIG. 2 shows one additional round trip in laser cavity 3, as compared with the embodiment of FIG. 1. It will be appreciated that curvatures of elements 16 and 10 and diameters of hole 15 can be chosen to allow a higher number of passes. In addition, convex surface 16a of optical coupler 16 advantageously can be arranged to have a coating giving partial reflectivity over a central portion corresponding to the mode size of stable cavity 2, and full reflection elsewhere on the surface, increasing the efficiency of laser cavity 3.

The advantage of the modified embodiment shown in FIG. 2 is that it does not require that the expanding beam in unstable laser cavity 3 increase in size from the stable mode size of laser cavity 2 to the full width of the gain medium on a single pass, thus allowing the use of smaller magnifications in unstable laser cavity 3, and thereby reducing its threshold.

What has been shown is a coupled stable-unstable laser resonator that provides high power, low divergence, narrow bandwidth radiation with the advantage over existing art that the laser radiation coupled from the stable to the unstable resonator is taken from the whole mode of the stable resonator, and not just the outer portions. This advance allows for independent adjustment of the mode size and outcoupled fraction of the stable resonator, thereby increasing the overall power that is extracted from the laser cavity.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A laser cavity providing high power laser radiation with diffraction-limited divergence and narrow-bandwidth, comprising:
   a stable laser cavity operating on a low order TEM mode and providing narrow bandwidth laser radiation;
   an unstable laser cavity disposed within said stable laser cavity; and
   an optical coupler located within said stable laser cavity and coupled to said unstable laser cavity for coupling said narrow bandwidth laser radiation from said stable laser cavity to said unstable laser cavity.

2. A laser cavity providing high power laser radiation with diffraction-limited divergence and narrow-bandwidth, comprising:
   a stable laser cavity including:
      first and second reflectors;
      a gain medium located between said first and second reflectors, said gain medium generating and amplifying laser radiation;
      an optical coupler located between said gain medium and said second reflector;
      a frequency narrowing means located between said optical coupler and said second reflector for limiting said laser radiation to a narrow bandwidth;
      an aperture located between said optical coupler and said second reflector for limiting the operation of said stable laser cavity to a low order TEM mode;
   an unstable laser cavity including:
      said gain medium;
      said first reflector; and
      said optical coupler, said optical coupler forming a feedback mirror of said unstable laser cavity and coupling said narrow bandwidth laser radiation from said stable laser cavity to said unstable laser cavity, said optical coupler transmitting laser radiation within said stable laser cavity without affecting said low order TEM mode.

3. The laser cavity of claim 2, wherein said optical coupler comprises:
a first surface for reflecting a predetermined percentage of laser radiation from said stable laser cavity to said unstable laser cavity; and
a second surface for transmitting laser radiation reflected from said second reflector toward said gain medium.

4. The laser cavity of claim 3, wherein said optical coupler has first and second surfaces which are convex and concave, respectively, said first and second surfaces being substantially parallel to each other.

5. The laser cavity of claim 4, wherein said first surface and said first reflector comprise a confocal pair.

6. The laser cavity of claim 2, wherein said second reflector is a reflective diffraction grating for further bandwidth narrowing said laser radiation.

7. The laser cavity of claim 2, wherein said frequency narrowing means is comprised of one or more elements selected from a group consisting of diffraction gratings, prisms and Fabry-Perot etalons, or a combination thereof.

8. The laser cavity of claim 2, wherein said optical coupler comprises a material transparent to laser radiation and having first and second surfaces opposing said first and second reflectors, respectively, said first surface having a partially reflective first section aligned with the optical centerline of said stable laser cavity and a second section surrounding said first section and coated with a highly reflective material.

9. The laser cavity of claim 8, wherein said first and second surfaces of said optical coupler are respectively convex and concave and are substantially parallel to each other.

10. The laser cavity of claim 9, wherein said first surface and said first reflector form a confocal pair.

11. The laser cavity of claim 9, wherein said second reflector is a reflective diffraction grating for further bandwidth narrowing said laser radiation.

12. The laser cavity of claim 2, further comprising a scraper mirror located between said gain medium and said optical coupler for coupling an output beam out of said unstable laser cavity.

* * * * *